Patented Sept. 1, 1942

2,294,878

UNITED STATES PATENT OFFICE 2,294,878

NITROGENOUS WAXY TO RESINOUS CONDENSATION PRODUCTS AND PROCESS OF PRODUCING SAME

Hans Georg Hummel, Mannheim, and Michael Jahrstorfer, Ludwigshafen-on-the-Rhine, Germany, assignors, by mesne assignments, to General Aniline & Film Corporation, New York, N. Y., a corporation of Delaware No Drawing. Application August 2, 1939, Serial No. 287,906. In Germany August 8, 1938

11 Claims. (Cl. 260—78)

The present invention relates to new nitrogenous condensation products and a process of producing same.

We have found that nitrogenous waxy to resinous condensation products which are capable of wide technical use can be prepared by amidating partially amidated polycarboxylic acid substances (i. e. partially amidated polycarboxylic acids themselves or their derivatives still capable of amidation) free from high molecular weight aliphatic radicles, (i. e. open-chain aliphatic or cycloaliphatic radicles containing more than four aliphatically linked carbon atoms) with amines containing at least one hydrogen atom attached to the amino nitrogen and at least one aliphatic radicle (open-chain or cycloaliphatic) having at least 12 carbon atoms. The term "aliphatic" appearing in the claims is to be construed as embracing open chain and cycloaliphatic radicles.

The polycarboxylic acids forming the basis of the partially amidated initial materials are for example oxalic acid, malonic acid, succinic acid, phthalic acid, isophthalic acid and terephthalic acid. The initial materials are derived from the said or other di- tri- or other poly-carboxylic acids by amidating at least one but not all of the carboxylic groups by means of ammonia, methylamine, ethylamine, butylamine dimethylamine, dibutylamine, aniline, aminodiphenyl, aminobenzamide, aminophenylurea or aminophenylthiourea. The groups

—C₆H₄CONHCONH₂, —C₆H₄SO₂NH₂ may also be contained in the amide groups of the initial materials.

As suitable partially amidated polycarboxylic acids or their derivatives there may be mentioned oxamic acid and its esters, as for example oxam-ethane, N-methyloxam-ethane, oxanilic acid and its esters, derivatives of oxanilic acid which are substituted in the benzene nucleus, as for example 4-sulphamino-oxanilic acid methyl ester, oxanilic acid derivatives containing halogen and also the compounds corresponding to oxanilic acid which contain the naphthylamine radicle instead of the aniline radicle; there may also be mentioned maleic amide acid and its esters, the partially amidated isophthalic and terephthalic acid and their esters, furthermore acids as are obtainable by amidating at least two amino groups of a polyamine with oxalic acid so that only one carboxylic group of the oxalic acid forms the amido group, the other carboxylic group being not amidated, or esters of such acids; such products are for example ethylene-bis-oxamic acid ethyl ester (from ethylene diamine and oxalic acid diethyl ester), para-phenylene-bis-oxamic acid ester (from para-phenylene diamine and oxalic acid ester) and diphenyl-4.4'-bis-oxamic acid ester (from benzidine and oxalic acid ester).

In the said compounds, by treatment with primary or secondary amines containing open-chain aliphatic or cycloaliphatic radicles having at least 12 carbon atoms, at least one further carboxylic group or group capable of amidation derived from a carboxylic group is converted into the amide group. It is usually advantageous to use such an amount of the said amines that the final product contains all the carboxylic groups or groups capable of amidation in amidated form.

Single amines or mixtures of amines may be employed. Suitable amines are for example the amine obtainable by converting montanic or natural resin acid into the nitriles and reducing the latter, dodecylamine, hexadecylamine, octodecylamine, dioctodecylamine, and also unsaturated aliphatic amines, such as undecenylamine, octodecenylamine, methyloctodecenylamine; amines obtainable by hydrogenation of high molecular weight aliphatic ketones, such as stearone and montanone, in the presence of ammonia and also the amines obtainable from colophony or naphthenic acid by hydrogenation in the presence of ammonia, such as abietinyl-amine and hydroabietinylamine or naphthenyl-amine are suitable. (The compound montanone and its preparation has been described by Easter-field and Taylor in the Journal of the Chem. Soc., vol. 99 (1911) pages 2302 to 2303.) Heterocyclic bases with secondarily combined nitrogen which contain an aliphatic or cycloaliphatic radicle having at least 12 carbon atoms may also be used, as for example heptadecenylimidazoline or the corresponding tetrahydropyrimidine compounds which can be obtained by condensation of fatty acids with 1.3-diamines or their salts.

The amidation of the partially amidated polycarboxylic acids or their derivatives with the said amines is effected by heating mixtures of the two components. If only one further carboxylic group is to be amidated, about equimolecular proportions are used. Heating to temperatures between 150° and 300° C. is usually preferable; it is continued until about the calculated amount of water has been split off when the free acid is used or until the calculated amount of alcohol has been split off when the carboxylic acid group to be amidated is in ester form. When using other derivatives of partially amidated polycarboxylic acids, as for example halides, a determination of the compound split off during the amidation, as for example hydrogen halide, may serve to determine when the reaction is completed. The condensation may also be carried out in the presence of solvents of high boiling point, as for example tetrahydronaphthalene, decahydronaphthalene, dichlorbenzene and trichlorbenzene or of agents splitting off water, as for example silicic acid gel.

The properties of the final products vary with the initial materials used. When using saturated fatty amines or wax amines there are usually obtained hard brittle products whereas when using unsaturated fatty amines or wax amines there are usually obtained soft, kneadable, waxlike products. When using resin amines, as for example abietinylamine or tetrahydroabietinylamine there are often obtained clear, transparent, resinous products. The products have relatively high dropping points and an excellent binding power for oil and the high boiling solvents usual in the industries working up waxes. They may therefore be used with advantage for producing products of high dropping point such as are necessary in electrotechnics, and substances having high oil binding power, such as are desirable in the preparation of shoe and floor preserving agents. They may also be added to other fatty and waxy substances in order to improve their properties.

The following examples will further illustrate how the present invention may be carried out in practice, but the invention is not restricted to these examples. The parts are by weight.

Example 1

300 parts of octodecenylamine are heated with 140 parts of oxam-ethane at 240° C. until 50 parts of alcohol have distilled over. The resulting condensation product is a pale yellow, waxy, soft, kneadable substance which has a dropping point of 146° C. and a softening point of 120° C.; it is clearly soluble in toluene and xylene at the boiling point; the solutions solidify in the cold to tough solid gels even in a very diluted state.

A part of the octodecenylamine may also be replaced by other high molecular weight aliphatic or cycloaliphatic amines, as for example dodecylamine, octodecylamine or abietinylamine, whereby without appreciably altering the dropping point or softening point the other properties, such as softness and adhesive power, may be considerably varied.

Example 2

200 parts of a high molecular weight aliphatic mixture consisting mainly of primary amines which has been prepared by catalytic hydrogenation of oxidation products of montan wax obtained according to the Patent No. 1,737,975 in the presence of ammonia are heated at 240° C. with 65 parts of oxam-ethane until about the calculated amount of alcohol has distilled off. The condensation product is a dark brown, hard, waxy substance having a dropping point of 146° C. and a softening point of 131° C. (according to Krämer-Sarnow).

Example 3

270 parts of octodecylamine and 193 parts of oxanilic acid ethyl ester are heated to about 170° C. in a vessel provided with a stirrer until the calculated amount of alcohol has distilled off. There is obtained a white, fairly hard, waxy substance which has a dropping point of 123° C. and a softening point of 116° C.

Example 4

150 parts of octodecenylamine and 150 parts of 4-sulphamido-oxanilic acid ethyl ester are heated to 260° C. while leading through a weak current of nitrogen. After 10 parts of alcohol have been distilled off there is obtained a pale yellow, soft, waxy product having a dropping point of 214° C. and a softening point of 161° C.

The 4-sulphamido-oxanilic acid ethyl ester used may be prepared by heating sulphanilic acid amide with oxalic acid diethyl ester; it has a melting point of 221° C.

Example 5

100 parts of a viscous amine obtained by catalytic hydrogenation of abietic acid nitrile are heated for some time at about 280° C. with 38 parts of oxam-ethane. The condensation product obtained after distilling off 16 parts of alcohol is a clear transparent, pale yellow, brittle resin having a dropping point of 102° C.; it is readily soluble in hot toluene.

Example 6

40 parts of heptadecenylimidazoline are heated for an hour at 300° C. with 16 parts of oxam-ethane. The product obtained is a soft fat-like mass having a dropping point of 230° C. The heptadecenylimidazoline used for the condensation may be prepared by the reaction of oleic acid, ethylene diamine and ethylene diamine hydrochloride.

Example 7

70 parts of octodecenylamine are heated to above 300° C. with 50 parts of diphenyl-4.4'-bisoxamic acid ethyl ester. After 12 parts of alcohol have distilled off, there is obtained a soft, pale yellow, wax-like product having a dropping point of 237° C. It is also possible to work with an excess of octodecenylamine; in this case the unconverted amine is removed by distillation in vacuo after completion of the condensation.

By using 125 parts of an amine obtained by catalytic hydrogenation of colophony in the presence of ammonia instead of octodecenylamine, a fairly soft, white mass which becomes plastic when kneaded is obtained which has a dropping point of 264° C.

Example 8

170 parts of terephthalic acid anilide monomethyl ester (melting point 188° C.) are heated for a long time with 160 parts of oleylamine at 260° C. while leading through a weak current of nitrogen. The reaction product is a pale brown, soft, wax-like mass having a dropping point of 180° C.

What we claim is:

1. The process of producing waxy to resinous nitrogenous condensation products which comprises heating a partially amidated polycarboxylic acid compound selected from the class consisting of partially amidated polycarboxylic acids, their esters and acyl halides, said compound being free from aliphatic radicles containing more than four carbon atoms, only with a monoamine containing a hydrogen atom attached to the amino nitrogen and an aliphatic radicle having more than 12 carbon atoms.

2. The process of producing waxy to resinous nitrogenous condensation products which comprises heating to between 150° C. and 300° C. a partially amidated polycarboxylic acid compound selected from the class consisting of partially amidated polycarboxylic acids, their esters and acyl halides, said compound being free from aliphatic radicles containing more than four carbon atoms, only with a monoamine containing a hydrogen atom attached to the amino nitrogen and an aliphatic radicle having more than 12 carbon atoms.

3. The process as defined in claim 1, wherein the polycarboxylic acid is oxalic acid.

4. The process of producing waxy to resinous nitrogenous condensation products which comprises heating a unilaterally amidated oxalic acid ester which is free from aliphatic radicles containing more than four carbon atoms, only with a monoamine containing a hydrogen atom attached to the amino nitrogen and an aliphatic radicle having more than 12 carbon atoms.

5. The process of producing waxy to resinous nitrogenous condensation products which comprises heating a partially amidated polycarboxylic acid compound selected from the class consisting of partially amidated polycarboxylic acids, their esters and acyl halides, said compound being free from aliphatic radicles containing more than four carbon atoms, only with a monoamine containing a hydrogen atom attached to the amino nitrogen and an aliphatic radicle having more than 12 carbon atoms, said monoamine being free from carboxylic groups and being derived from a naturally occurring resin.

6. The process of producing waxy to resinous nitrogenous condensation products which comprises heating a unilaterally amidated oxalic acid ester which is free from radicles containing more than four carbon atoms, only with a monoamine containing a hydrogen atom attached to the amino nitrogen and an aliphatic radicle having more than 12 carbon atoms, said monoamine being free from carboxylic groups and being derived from a naturally occurring resin.

7. Waxy to resinous nitrogenous condensation products obtained according to the method of claim 1.

8. Waxy to resinous nitrogenous condensation products obtained according to the method of claim 2.

9. Waxy to resinous nitrogenous condensation products obtained according to the method of claim 4.

10. Waxy to resinous nitrogenous condensation products obtained according to the method of claim 5.

11. Waxy to resinous nitrogenous condensation products obtained according to the method of claim 6.

HANS GEORG HUMMEL.
MICHAEL JAHRSTORFER.